United States Patent [19]
Chudgar et al.

[11] 3,944,453
[45] Mar. 16, 1976

[54] HOSE CONSTRUCTION

[75] Inventors: Anil H. Chudgar; Richard L. Fischer; Marvin E. Holmgren, all of Manitowoc, Wis.

[73] Assignee: Imperial-Eastman Corporation, Chicago, Ill.

[22] Filed: July 5, 1974

[21] Appl. No.: 485,895

[52] U.S. Cl. ............... 156/143; 138/125; 138/132; 138/144; 156/149; 156/172; 156/173; 156/244; 156/272; 156/298; 156/309; 219/121 LM
[51] Int. Cl.² ........................................... C21D 1/18
[58] Field of Search ........... 156/143, 149, 169, 171, 156/172, 173, 187, 244, 272, 298, 307, 309, 294; 138/118, 123, 125, 126, 129, 132; 219/121 LM

[56] References Cited
UNITED STATES PATENTS

| | | | |
|---|---|---|---|
| 2,977,839 | 4/1961 | Koch | 156/149 |
| 3,152,618 | 10/1964 | Rothermel et al. | 138/122 |
| 3,633,629 | 1/1972 | Rider | 156/149 |
| 3,721,271 | 3/1973 | Chudgar | 156/294 |
| 3,769,117 | 10/1973 | Bowen et al. | 156/272 |
| 3,773,089 | 11/1973 | Chudgar | 156/149 |
| 3,776,794 | 12/1973 | Ingham | 156/149 |
| 3,791,898 | 2/1974 | Remi | 156/149 |

*Primary Examiner*—Edward G. Whitby
*Attorney, Agent, or Firm*—Wegner, Stellman, McCord, Wiles & Wood

[57] ABSTRACT

An improved hose construction and method of forming the same wherein a reinforcement layer is bonded to a thermoplastic core by a solventless bonding layer defining an inner thermal weld portion substantially autogenous with the outer surface portion of the core tube and an outer portion mechanically interlocked with the confronting inner portion of the reinforcement layer.

The bonding layer is thermally formed to be autogenous with the outer surface portion of the core tube and may include an added layer of thermoplastic material which is concurrently fused to define the fused bonding layer. The added layer is compatible with the core tube outer surface portion and is preferably formed of similar thermoplastic material. The reinforcement layer is wrapped about the core tube under tension to provide an embedment thereof in the bonding layer to effect a positive mechanical interlocking therebetween.

18 Claims, 8 Drawing Figures

HOSE CONSTRUCTION

BACKGROUND OF THE INVENTION

1. Field of the Invention

This invention relates to hose constructions and in particular to hose constructions utilizing thermoplastic core tubes.

2. Description of the Prior Art

In the construction of hose, a tubular core is overlaid with a reinforcement layer which imparts strength and burst resistance to the hose. It is desirable to provide a reinforcement layer which maintains substantial flexibilty in the hose and which is kink-resistant while yet providing the desirable reinforcement function. A large number of different types of hose constructions have been developed over the years providing different desirable features and utilizing a wide range of materials. Further, a number of different techniques have been utilized for bonding the reinforcement layer to the outer surface of the core tube.

In certain conventional hose constructions, an outer sheath is further overlaid about the reinforcement layer and, here again, a large number of different materials and techniques for bonding the sheath to the reinforcement layer have been developed.

Examples of a number of such improved hose structures include those disclosed in the Harold E. Jackson et al. U.S. Pat. No. 3,172,427 wherein a reinforcement layer is disposed in tensioned relationship about a nylon core tube.

Another improved hose structure is disclosed in the Marvin E. Holmgren U.S. Pat. No. 3,186,438 wherein a nylon core tube is provided with a polyester reinforcement layer and a ribbed outer sheath.

In U.S. Pat. No. 3,233,024 of Harold E. Jackson et al., a hose is formed by applying a polyester braid around an extruded nylon core tube. Upon extrusion of a sheath thereabout, the composite hose is cooled by an improved cooling device.

In Edward J. Ross U.S. Pat. No. 3,266,527, a sheath layer is heat shrunk onto the core tube prior to the application of a reinforcement layer thereabout. The different layers of the hose may be bonded to one another by suitable adhesive materials.

In Marvin E. Holmgren U.S. Pat. No. 3,332,447, an adhesive is used to secure different portions of the hose structure together by both cross-linking and heat fusible modes. The adhesive coated hose is heated to dry off solvent from the adhesive and cause cross-linking agents of the adhesive to cross link with the molecular structure of the reinforcement layer. The core tube may be formed of a heat fusible or cross-linkable material.

A hose construction is disclosed in the Thomas F. Rider U.S. Pat. No. 3,633,629 wherein the reinforcement layer includes two different types of fibers, one of which is thermally fusion bonded to the core and the other of which is free for movement relative to the core. The core surface is raised to fusion temperature by a heating coil immediately before application of the reinforcement layer. A coolant fluid may be circulated through the core tube to maintain the internal stability thereof during the application of the reinforcement layer.

In U.S. Pat. No. 3,721,271 of Anil H. Chudgar, a hose construction is disclosed wherein nylon reinforcement layer fibers are autogenously bonded to the nylon tube core by a nonsolvent agent.

In U.S. Pat. No. 3,373,089 of Anil H. Chudgar, a nonsolvent nylon softening agent is utilized to soften the outer surface of the nylon core tube and permit mechanical interlocking of the reinforcement layer fibers therewith upon resetting of the core tube surface.

The above discussed prior art patents are owned by the assignee hereof. Prior art hose constructions of others include those of Richard A. Matthews U.S. Pat. No. 3,116,760 wherein a polyurethane adhesive is used to bond the reinforcement layer to a polyurethane core tube. In a Richard A. Matthews U.S. Pat. No. 3,722,550, the core tube includes a peripheral adhesively activated zone. The activation material of the adhesive penetrates into the core tube and after the reinforcement layer is applied, a predetermined period of time is required to enable substantially complete evaporation of the activation material to provide the desired bond between the core tube and reinforcement material, this period being disclosed as about 8 to 36 hours.

In Alfred R. Phillips et al. U. S. Pat. No. 3,726,321, an elastomeric adhesive is applied on the core tube which, after the reinforcement layer is applied, is allowed to set and maintain an elastomeric adhesive bond therebetween.

In the prior art manufactures using solvent or other fusion means, control of penetration into the yarn has been difficult.

SUMMARY OF THE INVENTION

The present invention comprehends an improved hose construction wherein a thermally formed, fused bonding layer is provided autogenous with the outer surface portion of the core tube and defining a mechanical interlock with the inner surface portion of a fibrous reinforcement layer provided thereabout. The reinforcement layer is embedded in the fused bonding layer so that upon subsequent cooling thereof, the bonding layer defines a set thermal weld inner portion autogenous with the core tube and a set outer portion defining the desired mechanical interlock with the inner surface fibers of the reinforcement layer. As the bondment layer is free of solvent material, a rapid low cost securing of the reinforcement layer to the core tube is obtained while yet providing high strength of the bond therebetween and further facilitating accurate control of the penetration of the fused bondment layer material into the reinforcement layer.

The fusing of the bondment layer may be effected by suitable heating means, such as laser beam means, conductive heating thereof by a suitable heated fluid, heating thereof with a suitable resistance heater wire embedded therein, etc.

The bonding layer may include an added layer of thermoplastic material provided about the core tube prior to the thermal fusing step. The reinforcement layer may be applied under a preselected tension permitting the inner surface portion of the reinforcement layer to become embedded in the fused bonding layer. The added layer may comprise material similar to that of the core tube so as to provide a homogenous bonding layer.

The reinforcement layer may be formed of a thermoplastic material having a higher fusion temperature than that of the core tube so as to assure the provision of the desired mechanical interlock between the bonding layer and reinforcement layer and autogenous weld between the bonding layer and the inner portion of the core tube. The reinforcement layer may comprise any suitable reinforcement material providing the desirable mechanical interlocked association with the fused bonding layer as discussed above.

The added layer may comprise a thin thermoplastic film. In the illustrated embodiment, the film may have a thickness in the range of approximately 0.0001 inch to 0.03 inch. The added layer may be coextruded with the core tube as desired. The added layer further may be provided with reinforcement fibers as desired.

Thus, the hose construction of the present invention is extremely simple and economical while yet providing an improved high strength, burst-resistant, kink-free hose structure.

BRIEF DESCRIPTION OF THE DRAWING

Other features and advantages of the invention will be apparent from the following description taken in connection with the accompanying drawing wherein.

DESCRIPTION OF THE PREFERRED EMBODIMENTS

Figure 1:
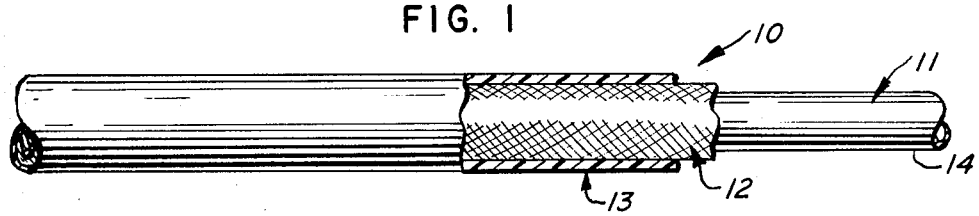
FIG. 1 is a perspective view of a hose construction embodying the invention with portions broken away to facilitate illustration thereof.
Figure 2:
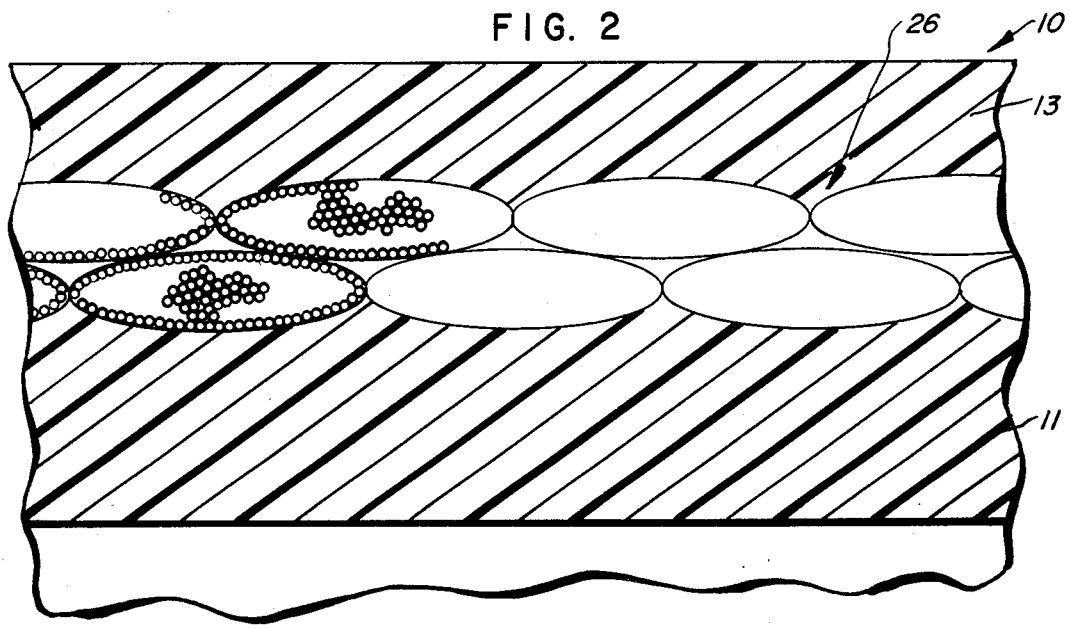
FIG. 2 is a fragmentary enlarged diametric section of the hose construction of FIG. 1.
Figure 3:
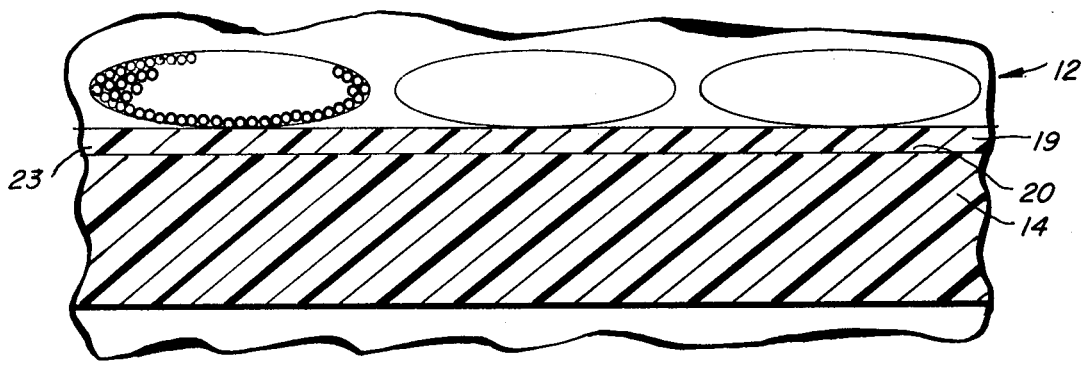
FIG. 3 is a fragmentary enlarged diametric section illustrating a first step in the formation thereof.
Figure 4:
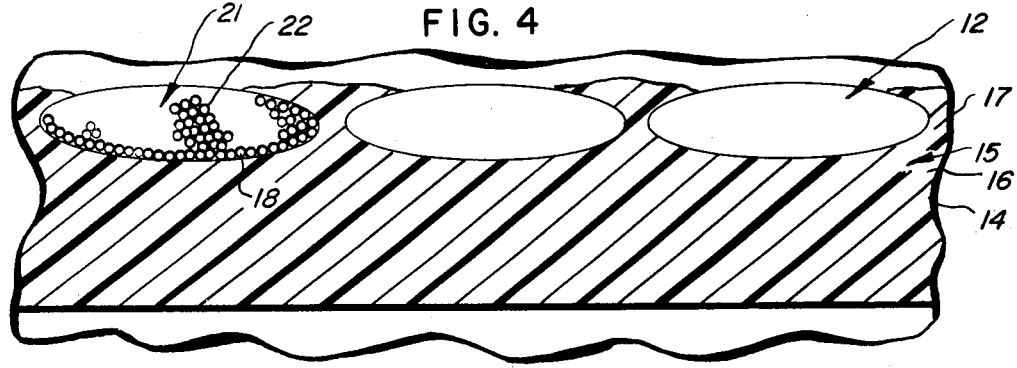
FIG. 4 is a fragmentary enlarged diametric section illustrating a further step in the formation thereof.

In the exemplary embodiment of the invention as disclosed in FIGS. 1–6 of the drawing, a hose construction generally designated 10 is shown to include a core tube, a reinforcement layer 12 disposed about the core tube, and an optional outer sheath 13 disposed about the reinforcement layer. The present invention comprehends an improved method of forming such a hose wherein the reinforcement layer is bonded to the outer surface portion 14 of the tubular core by an improved bondment defined by a bonding layer 15. Bonding layer 15 comprises a solventless thermal weld inner portion 16 which is substantially autogenous with the core tube outer surface portion 14 in the completed construction of the hose as illustrated in FIG. 4. The bonding layer further includes an outer portion 17 which is mechanically interlocked with the confronting fiber portion 18 of the reinforcement layer 12. Thus, the reinforcement layer is secured to the core tube by a composite bonding system including an autogenous bond of the bonding layer to the core tube and a mechanical bond of the bonding layer to the reinforcement layer.

As shown in FIG. 3, the bonding layer may comprise an added thin layer 19 on the outer surface 20 of the core tube portion 14 which may be extruded over the core tube or coextruded therewith. The added bonding layer 19 may be formed of the same material as the core tube to define a homogenous bonding layer 15. Alternatively, the added layer 19 may be formed of a material compatible with the material of the core tube portion 14 so as to define an autogenous weld therewith.

The provision of the autogenous bond is effected herein by thermal action so as to provide a solventless bonding of the reinforcement layer to the core tube. The fusion of the bonding layer which, as discussed above, may comprise the outer portion 14 of the core tube and the added layer 19, may be effected by any suitable heating means, such as by laser beam heating, conductive heating with a fluid, heating by a resistance wire embedded in the core tube, radiant heating, etc.

The reinforcement layer may comprise any suitable reinforcement including braided, spiral wrapped, knitted, or other conventional forms of hose reinforcement constructions. The reinforcement layer may be formed of a fibrous fabric which may comprise organic, synthetic resin, or metallic fibrous material. Where the reinforcement layer material is a thermoplastic, the fusion temperature thereof preferably is higher than that of the bonding layer to substantially preclude welding of the bonding layer to the reinforcement layer and provide the desirable mechanical interlock. Alternatively, the bonding layer also may be thermally fused to the reinforcement layer.

The fusion of the bonding layer may be effected by providing the necessary thermal energy thereto immediately prior to the wrapping of the reinforcement layer thereabout, or alternatively, may be effected subsequent thereto. The reinforcement layer is preferably wrapped under tension about the core tube so as to provide the desirable embedment of the reinforcement layer surface portion in the bonding layer 15.

The core tube and thermoplastic layer 19 are preferably formed of similar medium to high molecular weight, thermoplastic material. As discussed above, other compatible materials may be utilized as the added layer 19 material, but should be capable of forming an autogenous weldment with the fused outer portion 14 of the core tube.

The invention further comprehends that the layer 19 may be applied in liquid form with the solvent being removed prior to the thermal fusion of the layer.

The tube may be internally supported during the heating operation by any suitable means, such as the flow of pressurized coolant fluid therethrough. The viscosity of the fused bonding layer may be accurately controlled to facilitate preventing complete penetration thereof into the strands 21 of fibers so that the internal fibers 22 are free of bonding material and may slide relative to each other for improved flexibility of the hose construction.

If desired, reinforcement fibers, such as fibers 23, may be provided in the layer 19.

Figure 5:
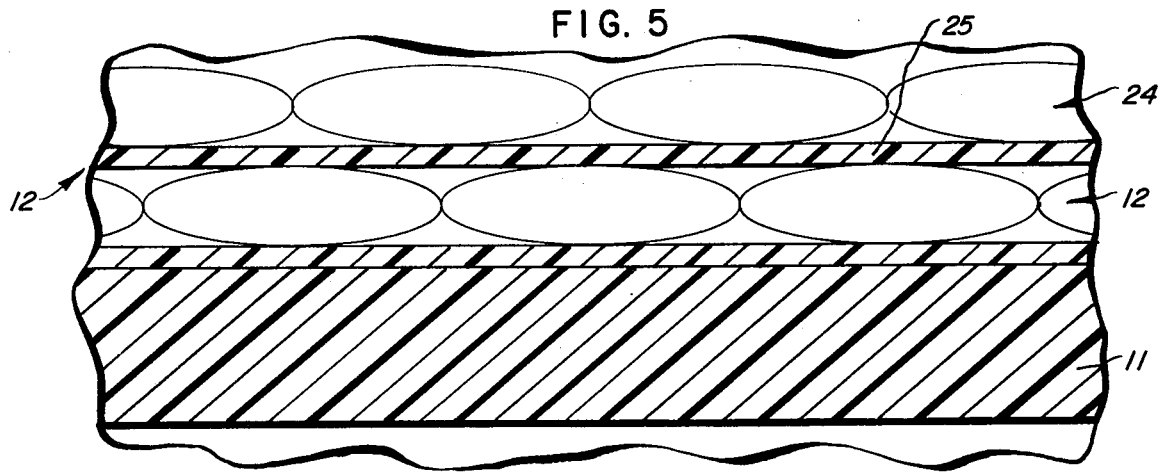
FIG. 5 is a fragmentary enlarged diametric section illustrating a first step in a modified construction wherein a second reinforcement layer is applied about the first reinforcement layer.
Figure 6:
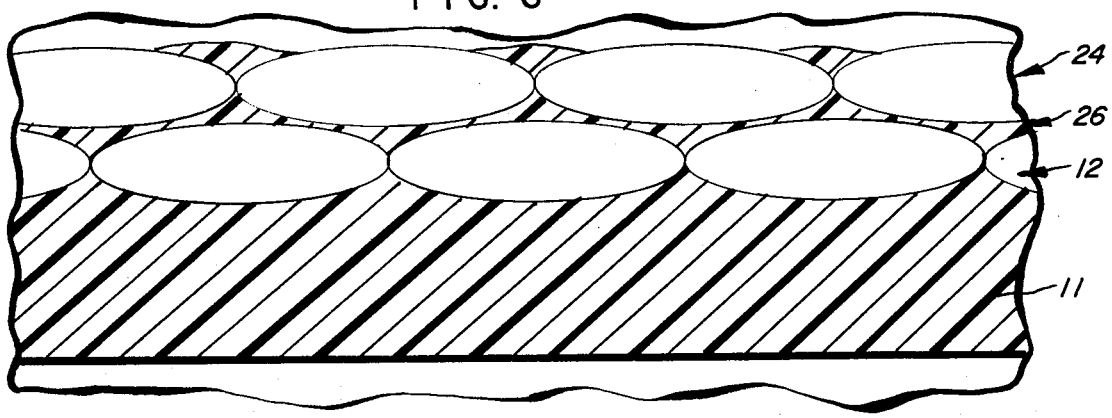
FIG. 6 is a fragmentary enlarged diametric section illustrating a further step in the formation thereof.

As shown in FIG. 5, the reinforcement may include a second layer 24 which may be interlocked with the first layer 12 by a bondment layer 25 which may be formed of the same material as bondment layer 19 so that upon fusion thereof, the plurality of reinforcement layers is effectively bonded to the core tube by a composite mechanical interlock-autogenous bonding layer 26, as shown in FIG. 6.

The hose construction may be utilized with or without an outer sheath 13 as indicated briefly above.

Where sheath 13 is provided, the sheath may be bonded to the bonding layer 26, as illustrated in FIG. 2, by an autogenous bond between the sheath and bonding layer similar to the autogenous bond between the core tube 11 and bonding layer. Thus, in the completed sheathed hose construction of FIGS. 1 and 2, the core tube and sheath are effectively welded to the bonding layer, and the reinforcement is effectively interlocked thereto to provide an improved hose construction 10 having high strength, burst-resistance, flexibility and long life.

Figure 7:
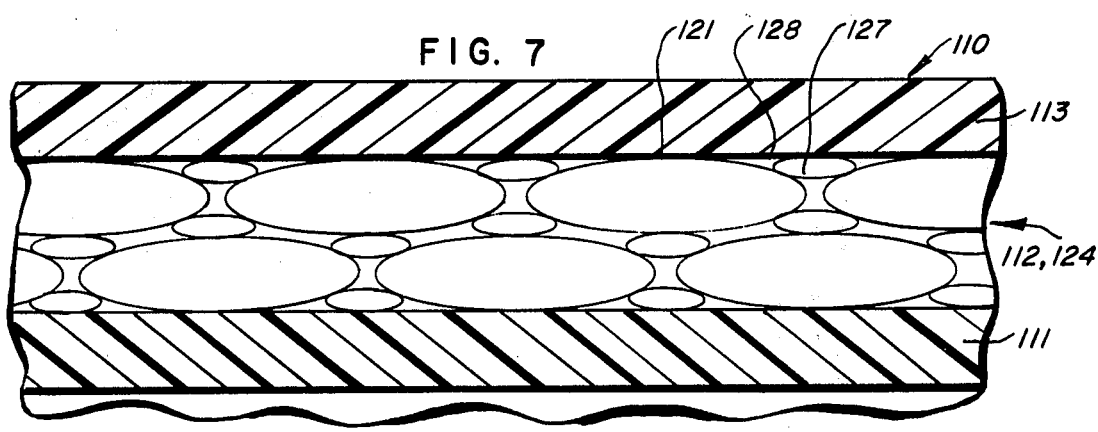
FIG. 7 is an enlarged diametric section illustrating the first step in still another construction embodying the invention.
Figure 8:
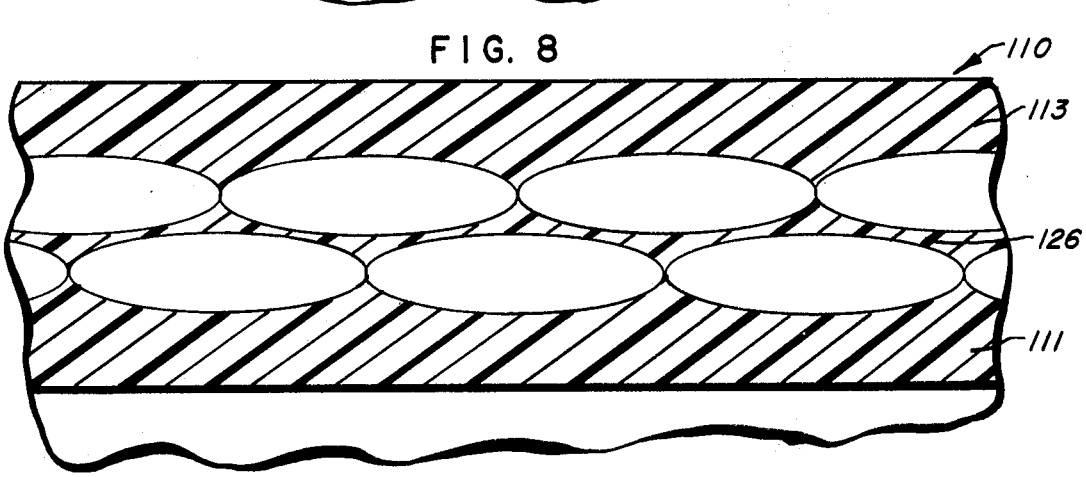
FIG. 8 is a fragmentary enlarged diametric section illustrating a second step thereof.

The invention further comprehends a modified method of obtaining the improved bonding of the reinforcement layer to the hose core and/or sheath, as more specifically illustrated in FIGS. 7 and 8. The improved hose construction 110 shown therein comprises a core tube 111 similar to core tube 11 and a sheath 113 similar to sheath 13 of hose 10. The bonding of the reinforcement 112, 124 to the core tube and sheath is effected by the novel composite autogenous bond-mechanical bond system of hose 10 but is effected by suitably disposing the bonding layer material 127 in the interstices 128 between strands 121 of the reinforcement fabric as illustrated in FIG. 7. Upon fusion of the reinforcement material 127, the bondment layer 126 is provided so that the resultant hose construction 110 is effectively similar to hose construction 10, as discussed above.

In another modified method of providing the improved bonding of the reinforcement layer to the hose core, the bonding layer may be extruded onto the hose core. The relatively high temperature of the fused extruded material effects a fusion of the extruded layer onto the previously formed core to provide the desired autogenous bond therebetween. The reinforcement layer may be immediately applied to the still fused extruded layer so as to obtain the desired embedment and mechanical interlock therebetween upon the setting of the extruded layer. As discussed above, the extruded layer may be comprised of the same material as the core material or other suitable compatible material permitting the desired fused autogenous bond with the core and the nonfused mechanical interlock bond with the reinforcement layer.

The foregoing disclosure of specific embodiments is illustrative of the broad inventive concepts comprehended by the invention.

We claim:

1. The method of forming a hose comprising the steps of: providing a thermoplastic core tube defining an outer surface portion; providing a thermoplastic layer about said core tube; thermally forming a fused bonding layer of said outer surface portion and said thermoplastic layer; applying a fibrous reinforcement layer about the tube to cause the surface fibers thereof to be embedded in the fused bonding layer; and cooling the fused bonding layer to form concurrently a set thermal weld inner portion autogenous with the core tube and a set outer portion mechanically interlocked to said inner surface fibers of the reinforcement layer, said inner and outer portions being substantially continuous.

2. The method of forming a hose as set forth in claiim 1 wherein the reinforcement layer fibers are formed of a thermoplastic material having a fusion temperature higher than that of said core tube surface portion.

3. The method of forming a hose as set forth in claim 1 wherein said thermoplastic layer comprises a layer of material similar to that of said core tube.

4. The method of forming a hose as set forth in claim 1 wherein said reinforcement layer is formed of metallic wires.

5. The method of forming a hose as set forth in claim 1 wherein said reinforcement layer is wrapped about the core tube under a preselected tension urging the inner surface portion thereof firmly into said fused bonding layer.

6. The method of forming a hose as set forth in claim 1 wherein said reinforcement layer is resilient and is wrapped about the core tube under tension prior to the fusing of said bonding layer whereby tension in the wrapped reinforcement layer causes the reinforcement layer to become embedded in the fused bonding layer.

7. The method of forming a hose as set forth in claim 1 wherein said thermoplastic layer is formed of a medium to high molecular weight synthetic resin.

8. The method of forming a hose as set forth in claim 1 wherein an additional layer of material similar to that of said core tube is overlaid on said reinforcement layer, a second reinforcement layer is applied thereabout, and said additional layer is fused to cause embedment therein of the outer surface portion of said first named reinforcement layer and the inner surface portion of said second reinforcement layer.

9. The method of forming a hose as set forth in claim 1 wherein an additional layer of material similar to that of said core tube is overlaid on said reinforcement layer, a second reinforcement layer is applied thereabout, and said additional layer is fused to cause embedment therein of the outer surface portion of said first named reinforcement layer and the inner surface portion of said second reinforcement layer, and interlocking of said additional layer with said bonding layer.

10. The method of forming a hose as set forth in claim 1 wherein an additional layer of material similar to that of said core tube is overlaid on said reinforcement layer, a second reinforcement layer is applied thereabout, and said additional layer is fused to cause embedment therein of the outer surface portion of said first named reinforcement layer and the inner surface portion of said second reinforcement layer, and concurrently interlocking of said additional layer with said bonding layer.

11. The method of forming a hose as set forth in claim 1 wherein said thermoplastic layer comprises a thermoplastic fibrous having a thickness in the range of approximately 0.0001 inch to 0.03 inch.

12. The method of forming a hose as set forth in claim 1 wherein said core tube and thermoplastic layer are coextruded.

13. The method of forming a hose as set forth in claim 1 wherein an added layer of thermoplastic material is provided about said core tube prior to said thermally fusing step, and said added layer and said outer surface portion are concurrently fused to define said fused bonding layer, said added layer being provided with reinforcement fibers.

14. The method of forming a hose as set forth in claim 1 wherein said reinforcement layer is further caused to partially fuse with said bonding layer.

15. The method of forming a hose as set forth in claim 1 wherein said bonding layer is fused by laser beam heating thereof.

16. The method of forming a hose as set forth in claim 1 wherein said bonding layer is fused by conductive heating with a fluid.

17. The method of forming a hose as set forth in claim 1 wherein said bonding layer is fused by heating thereof with a resistance wire embedded in said core tube.

18. The method of forming a hose as set forth in claim 1 wherein additional layers are bonded therein.

* * * * *